US007302362B2

(12) United States Patent
Misra et al.

(10) Patent No.: US 7,302,362 B2
(45) Date of Patent: Nov. 27, 2007

(54) SYSTEM AND METHOD FOR EFFICIENT AND COLLECTIVE ADJUSTMENT OF SENSOR REPORTING RANGES FOR LONG-LIVED QUERIES

(75) Inventors: Archan Misra, Ardsley, NY (US); Rajeev Shorey, New Delhi (IN); Wen Hu, Randwick (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/365,215

(22) Filed: Mar. 1, 2006

(65) Prior Publication Data

US 2007/0208535 A1    Sep. 6, 2007

(51) Int. Cl.
*G06F 17/40* (2006.01)
*G06F 17/00* (2006.01)

(52) U.S. Cl. ............... 702/182; 340/3.1; 340/500; 340/870.01; 340/870.07; 340/870.16; 700/28; 700/32; 700/108; 702/187; 702/188

(58) Field of Classification Search ............. 340/3.1, 340/3.3, 3.31, 3.32, 500, 679, 680, 870.01, 340/870.02, 870.07, 870.16; 700/1, 28, 32, 700/33, 34, 73, 74, 90, 108; 702/1, 33, 81, 702/127, 182, 187, 188
See application file for complete search history.

(56) References Cited

U.S. PATENT DOCUMENTS 2,883,255 A * 4/1959 Anderson ................. 346/34
3,135,573 A * 6/1964 Thompson et al. ....... 346/33 R
3,142,820 A * 7/1964 Daniels ..................... 710/15
3,147,370 A * 9/1964 Lowman .................... 702/81
3,349,374 A * 10/1967 Gabrielson et al. ...... 340/3.41
3,526,757 A * 9/1970 Rees et al. .................. 714/2
3,534,337 A * 10/1970 Helmut et al. ............ 702/188

(Continued)

OTHER PUBLICATIONS

Olston, et al., "Offering a Precision-Performance Tradeoff for Aggregation Queries over Replicated Data", Proceedings of the 26th VLDB Conference, Cairo, Egypt, 2000, pp. 144-155.

(Continued)

*Primary Examiner*—Edward R Cosimano
(74) *Attorney, Agent, or Firm*—Scully, Scott, Murphy & Presser, P.C.; Jesse Abzug, Esq.

(57) ABSTRACT

A system and method for providing energy-efficient support of continuous aggregate queries in a sensor network by efficiently orchestrating the collection and transmission of data gathered by a collective set of sensors to ensure conformance to a specified QoI bound. To ensure this, the sink communicates a potentially different value of precision range or interval to each individual sensor; the sensor is adapted to only report its samples back to the sink if the sample values fall outside this specified range. An additional way to specify temporally varying precision ranges to an individual sensor or groups of sensors is provided without having to explicitly communicate the precision bounds for these different time instants. Using temporally varying precision ranges permits the exploitation of temporal correlation among the sample values recorded by an individual sensor to further reduce the need for reports from the sensors. This approach is more energy-efficient and improves performance of long-running pervasive environment monitoring applications.

31 Claims, 5 Drawing Sheets

U.S. PATENT DOCUMENTS

| | | | | |
|---|---|---|---|---|
| 5,613,061 | A * | 3/1997 | Taylor | 714/30 |
| 5,774,052 | A * | 6/1998 | Hamm et al. | 340/540 |
| 5,812,756 | A * | 9/1998 | Taylor | 714/30 |
| 6,510,350 | B1 * | 1/2003 | Steen, III et al. | 700/9 |
| 6,810,324 | B1 * | 10/2004 | Nadkarni | 701/207 |
| 6,822,749 | B1 * | 11/2004 | Christoph | 356/609 |
| 6,957,143 | B1 * | 10/2005 | Nadkarni | 701/207 |
| 7,006,923 | B1 * | 2/2006 | Rubin | 702/19 |
| 7,102,392 | B2 * | 9/2006 | Hsu et al. | 327/20 |
| 2004/0010390 | A1 * | 1/2004 | Kelly, Jr. et al. | 702/150 |
| 2004/0194980 | A1 * | 10/2004 | McSheffrey, Jr. et al. | 169/75 |
| 2005/0056090 | A1 * | 3/2005 | McSheffrey, Jr. et al. | 73/291 |
| 2005/0200480 | A1 * | 9/2005 | Caras et al. | 340/539.22 |
| 2006/0158229 | A1 * | 7/2006 | Hsu et al. | 327/20 |

OTHER PUBLICATIONS

Olston, et al., "Adaptive Precision Setting for Cached Approximate Values", ACM SIGMOND May 21-24, 2001, Santa Barbara, California, USA, Copyright 2001 ACM 1-58113-332-04/01/05.

Han, et al., "Energy Efficient Data Collection in distributed Sensor Environments", Department of Computer Science, University of California, Irvine, CA 92697-3425, no date.

* cited by examiner

SYSTEM AND METHOD FOR EFFICIENT AND COLLECTIVE ADJUSTMENT OF SENSOR REPORTING RANGES FOR LONG-LIVED QUERIES

FIELD OF THE INVENTION

This invention relates generally to the field of information gathering, such as by sensor devices, and particularly, to a novel method for gathering and efficiently orchestrating the transmission of data gathered by a collective set of sensors to ensure conformance to a specified level of data accuracy or precision indicated by an overlying application using the sensor devices.

BACKGROUND OF THE INVENTION

Many new computing applications are focusing on the automation and intelligent control of a variety of operations in enterprise and non-traditional environments, such as homes, shopping malls and stadiums. These applications often use a variety of sensor nodes or devices, which collect data about the dynamic state of their local environment, and transmit data back to a more traditional data processing infrastructure. Many of these computing applications involve long-lived monitoring, i.e., they are interested in the continual evolution of the environmental state as it evolves over a substantially long period of time. For example, the monitored data may be the temperature values reported by a sensor, or the number of people entering through a particular gate (as reported by a video or RFID sensor). Architecturally, such monitoring applications consist of one or more sensor nodes (that actually sense the environmental state), which report back to one or more sink nodes. This sink is typically connected to the traditional data processing network infrastructure and is responsible for collecting the individual data samples and then processing them to deduce higher-layer or derived environmental state (e.g., the average temperature reading from sensors in a particular spatial region). One of the main concerns in efficient data gathering in such sensor-based environments is the minimization of the communication overhead incurred by the sensors. This is especially true of emerging sensor infrastructures where the sensors are either resource-constrained themselves (e.g., operate on batteries and may be located in relatively inaccessible places) or utilize a communication infrastructure (e.g., a wireless network) that is bandwidth-limited.

The most well-known and efficient technique to reduce the communication traffic back from the sensors to the sink for such continuous monitoring applications is to use the notion of a precision range or interval associated with each sensor. Typical prior art sensor monitor techniques using this approach are described in the references to C. Olston and J. Widom, "Offering a precision-performance tradeoff for aggregation queries over replicated data," in VLDB '00: Proceedings of the 26th Conference on Very Large Data Bases, Margan Kaufmann Publishers Inc., 2000, pp. 144-155; C. Olston, B. T. Loo, and J. Widom, "Adaptive precision setting for cached approximate values," in SIGMOD '01: Proceedings of the 2001 ACM SIGMOD international conference on management of data. ACM Press, 2001, pp. 355-366; and, Q. Han, S. Mehrotra, and N. Venkatasubramanian, "Energy efficient data collection in distributed sensor environments," in ICDCS '04: Proceedings of the 24th International Conference on Distributed Computing Systems, IEEE Computer Society, 2004, pp. 590-597. Such approaches essentially bound the uncertainty about the precise value of a sensor's data to a specified value and have been previously reported in these prior art approaches. The precise range specifies an acceptable level of uncertainty, such that the sensor need not communicate its data samples back to the sink until and unless they fall outside this specified range. Precision ranges are particularly useful in many real-life applications which do not need to know the precise values of the environmental state, but can tolerate some amount of inaccuracy. For example, an application monitoring the temperature reading of a sensor may allow the individual sensor to have a precision range that is +/−1° C. This implies that, after a sensor reports back to the sink with a value of, say, 25° C., it need not communicate back to the sink its subsequent data samples unless they exceed 26° C. or fall below 24° C. Clearly, a wider range reduces the reporting frequency of the sensor, since many minor variations in the sampled values, often due to noise or environmental transients, lie within the specified interval. Of course, this approach works only as long as the resulting overall inaccuracy (or uncertainty regarding the collective statistical measure of interest to the application) is with the application's acceptable limits, since now the application will no longer receive any information from the sensor as long its values lies within the tolerance range. From a broader perspective, by accommodating a degree of divergence, albeit bounded, between the true value of the sensor and the perceived value at the sink, this approach transforms the conventional sink-initiated, polling-based model of data collection (where a sink periodically retrieves the data from the sensor, or the sensor periodically sends it data to the sink, even though there has not been significant change since the last transmission) to a more energy-efficient source-initiated, event-driven (where only significant changes in the reported values trigger an update to the sink) framework.

While this approach of setting the precision range is well defined for individual sensors, many sensor-based applications are concerned with the aggregate statistics computed from a plurality of sensors, rather than an individual sensor. Examples of such statistics include the mean, maximum or sum of the readings obtained from a target sensor set, where the target itself may be explicitly defined (i.e., sensors A, B and D) or, more likely, is implicitly specified through predicates on certain attributes, such as the sensor location, type or owner (i.e., all sensors of type "thermal" located in the "hawthorne office" and owned by "IBM security"). An alternative example would be a cumulative count of the number of people entering a stadium, composed as a sum of the individual readings reported by a sensor at each separate entry gate. In such scenarios, the application's tolerance range would be specified by a precision range on the aggregate (e.g., "tell me the average of all the sensors, with a tolerance of +/−2 units on the average"). In general, any application requiring data may specify, either explicitly or implicitly, a Quality of Information (QoI) bound, indicating some requirements on the accuracy or precision of the collective data.

Currently, there is no implemented solution that addresses the problem of efficiently orchestrating the transmission of data gathered by a collective set of sensors to ensure conformance to a specified QoI bound.

It would be highly desirable to provide a system and method for efficiently orchestrating the transmission of data gathered by a collective set of sensors to ensure conformance to a specified QoI bound, specially for long-lived monitoring applications, where conformance is desired continually over the application's lifetime.

One approach for using the precision based technique for such collective sensor data applications is to decompose an aggregate tolerance bound into identical precision ranges for each of the constituent sensors, e.g., for an application that desires to know the sum of the sensor readings A, B and C with a tolerance of 3 units, a trivial way to set precision ranges would be to associate a uniform precision range of 1 unit with each of the three sensors. However, this process of decomposing a collective precision range into individual precision settings suffers from two deficiencies: First, it fails to accommodate the fact that the sensor network may exhibit heterogeneity, so that it may be more efficient to distribute the precision ranges in an unequal manner. For example, if some sensors have lower battery capacity or are very distant from the sink and incur high communication overhead, it may be more efficient to provide them a larger precision range (thus, in general, a lower reporting rate), while compensating for this by tightening the bounds for more resource rich sensors; Second, this approach of adjusting the precision range is only performed at the time instants when a sensor reports back to the sink with a new value (outside the current range). The process makes no attempt to utilize the temporal correlation or predictability in the variation of each sensor's data. For example, for sensors monitoring the temperature on the outside wall of a building, it can be expected (or predicted) that the sensor readings should be higher during the day, and lower during the night.

It would thus be further highly desirable to provide a system and method that addresses the problem of efficiently orchestrating the collection and transmission of data gathered by a collective set of sensors to ensure conformance to a specified QoI bound while factoring into the data collection mechanism the knowledge of the expected or observed sensor behavior.

BRIEF SUMMARY OF THE INVENTION

The present invention provides a system and method for efficiently orchestrating the transmission of data gathered by a collective set of sensors to ensure conformance to a specified QoI bound.

The system and method of the invention is advantageously implemented for continuous collective data-gathering applications and, is adapted to accommodate the heterogeneity of the sensor population, effectively specifying looser bounds for sensors that are more resource-constrained, and consequently, tighter bounds for sensors with less resource constraints.

Particularly, a novel system architecture, called Collective Adaptive Precision Setting (CAPS) provides for energy-efficient support of continuous aggregate queries in a sensor network. In the CAPS framework, a sink (alternately referred to as a "computing node") is able to always ensure, over the entire query lifetime, that the aggregate value computed by it (and reported to the application) does not diverge from the true reading by more than a specified "tolerance". The key is to have the computing node communicate a precision range or interval to an individual sensor, with the idea that a sensor need not report its samples back to the computing node as long as they fall within this specified range.

More particularly, the invention relates to a system, method and computer program product for monitoring one or more sensor devices in a pervasive sensor environment. The method comprises:

providing a computing node in communication with each said one or more sensor devices, that computes distinct precision ranges for each individual sensor device or subsets of sensor devices, and then communicating said precision ranges to each individual sensor device;

at subsequent time instants, generating new data samples at one or more sensor devices and transmitting data sample values back to the computing node only when said sample values fall outside said computed precision range; and, updating by said computing node, the precision ranges for said one or more sensor devices and communicating updated precision ranges to said one or more sensor devices in response to receipt of a data sample value from that sensor, thereby continually satisfying a quality of information (QoI) bound, as specified by an application requesting a collective metric computed from the individual values of said one or more sensor devices.

In addition, the system, method and computer program product of the invention is able to exploit the temporal correlation among the successive data samples collected by individual sensors. This enables a sensor to report back its data samples only when they diverge from the expected or predicted behavior, even in cases when the expected or predicted behavior at some time instant is not necessarily within the specified tolerance range at some prior time instant.

Thus, in a further embodiment, a temporal prediction component is utilized in a sensor device to update, at the sensor device, its precision range values to continually reflect the expected temporal evolution of its range of values. In this manner the sensor device generates new data samples at subsequent time instants and transmits such data samples back to the computing node only when they fall outside the time-varying precision range previously specified by the computing node, the computing node subsequently updating the precision ranges again, by using its own temporal prediction component.

In a further embodiment, a temporal prediction component is utilized in the computing node to update, by the computing node, the precision ranges. The temporal prediction component at the computing node continually updates a tolerable range of values for each sensor device. The method further comprises:

checking to ensure that the time-varying tolerable range of values satisfy the QoI requirements of the applications at each new time instant, and if the QoI requirements of the applications are not satisfied, proactively re-computing the precision ranges for said plurality of said sensors, and subsequently communicating any modifications to the precision ranges to the affected plurality of sensors.

In a further embodiment, a temporal prediction component is utilized in both the computing node and the sensor devices to update the precision ranges.

In either of these further embodiments, temporally varying precision ranges may be specified to an individual sensor or groups of sensors, without having to explicitly communicate the precision bounds for these different time instants. By using temporally varying precision ranges, the present invention allows for the exploitation of temporal correlation among the sample values recorded by an individual sensor to further reduce the need for reports from the sensors Advantageously, the system and method of the invention is ideal for many long-running pervasive environment monitoring applications implementing continuous queries with minimum expenditure in communications overhead.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
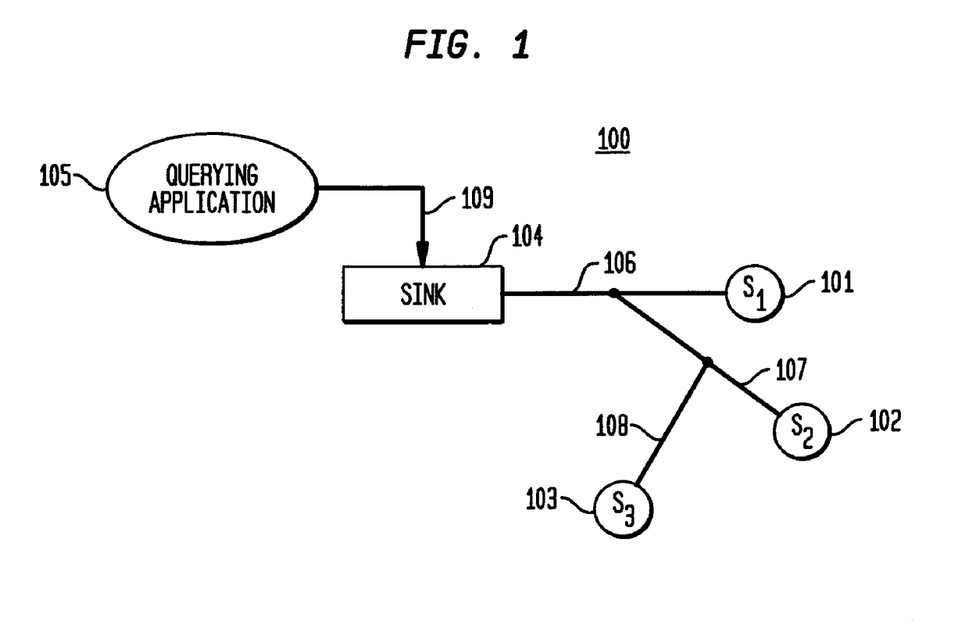
FIG. 1 shows the general system architecture 100 for enabling continuous query operations over a sensor network.

A system and method for efficiently orchestrating the transmission of data gathered by a collective set of sensors to ensure conformance to a specified QoI bound is now described with reference to FIG. 1. As shown in FIG. 1, a system architecture 100, alternately referred to herein as the Collective Adaptive Precision Setting (CAPS) architecture, provides energy-efficient support of continuous aggregate queries in a sensor network. In the CAPS framework, a sink (computing) node 104 is enabled to always ensure, over the entire query lifetime, that the aggregate value computed by it (and reported to a querying application 105) does not diverge from the true reading by more than a specified "tolerance". To ensure this, the sink 104 communicates a precision range or interval to an individual sensor 101, 102; the sensor adapts its behavior to only report its subsequent samples back to the sink if the sample values fall outside this specified range. This bounded-divergence approach transforms the conventional sink-initiated, polling-based model of data collection to a more energy-efficient source initiated, event-driven framework where the focus is on the continuous queries, which improves performance of many long-running, pervasive, environment monitoring applications.

More particularly, as shown in FIG. 1, the architecture 100 includes a continuous querying or monitoring application 105 issuing a query 109, to the sink or collector device 104 that is part of a sensor network comprising a wired or wireless interconnection of sensor nodes 101-103 that connect to the sink or collector via respective wired or wireless sensor network connections 106-108. Each monitoring application 105 is assumed to require data from a defined set of sensors 101-103, which are connected to the sink node via the communication network. The method ensures that the individual bounds across the set of relevant sensors are coordinated so that the overall uncertainty in the statistical value of interest (a QoI metric such as the min, max, mean or sum values of a set of samples) is consistent with the specified QoI bound. As the individual sensors report different valued samples at different instants of time, the individual precision bounds may be continually adjusted to meet with specified collective tolerance range. The precision bounds are thus sensor-specific—they may vary over time based on the relative values or ranges of values reported by other sensors, or due to modifications in the communication overheads (e.g., due to changes in the sensor network topology). In one embodiment, as will be described in greater detail herein, the individual bounds for each of the relevant sensors are dynamically computed within the conventional computing infrastructure and then communicated by the sink node to the individual sensors. This communication may be addressed explicitly to individual sensors or, may be implicitly addressed to groups of sensors. An example of explicit addressing involves communicating to a sensor A to "set its precision range" to [24 units, 26 units], for example, indicating that the sink node 104 did not require a proactive update from the sensor as long as its data samples lay within this specified range. Examples of implicit addressing could be topology-based, whereby the sink node 104 may communicate to all "sensors that are 3 hops away from the sink" to use a precision range of [23 units, 26.5 units], for example, or even, value-based, whereby the sink may communicate to all "sensors currently with a reading of 24 units" to use a range of [23 units, 26 units], for example, and sensors with a reading of 25 units to use a range of [22 units, 27 units], for example. The sensors would then dynamically receive these tolerance ranges as instructions from the sink node, and consequently, adjust their reporting behavior as indicated.

Figure 2:
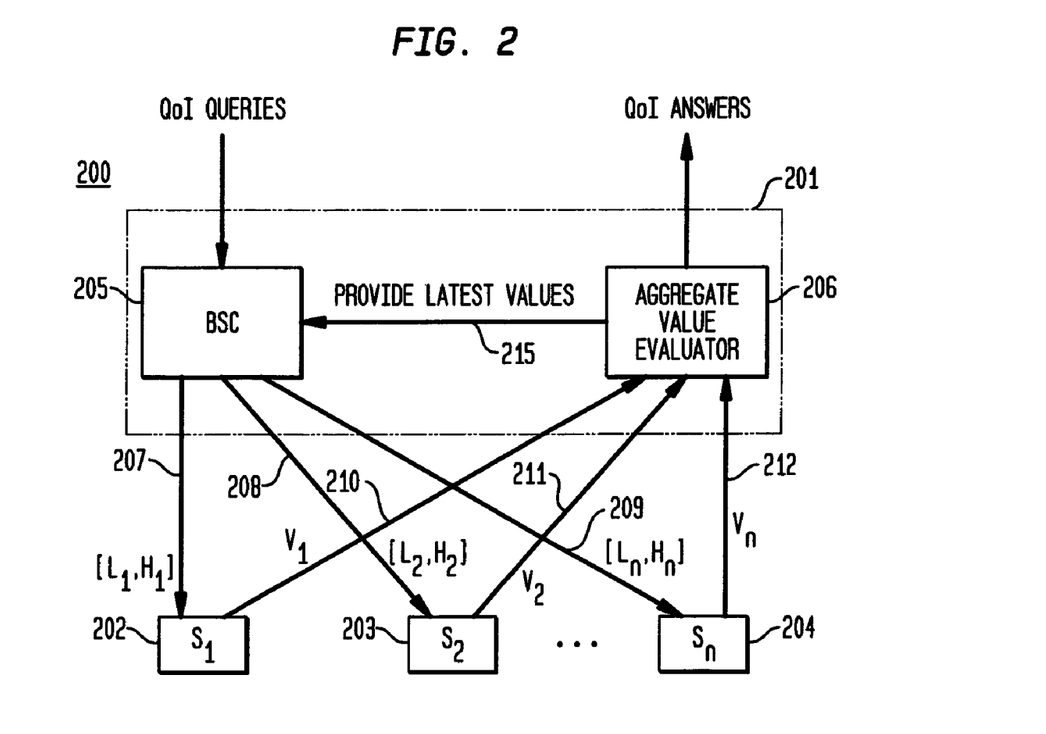
FIG. 2 is a basic diagram illustrating the CAPS architecture according to a first embodiment of the invention omitting temporal prediction.
Figure 3:
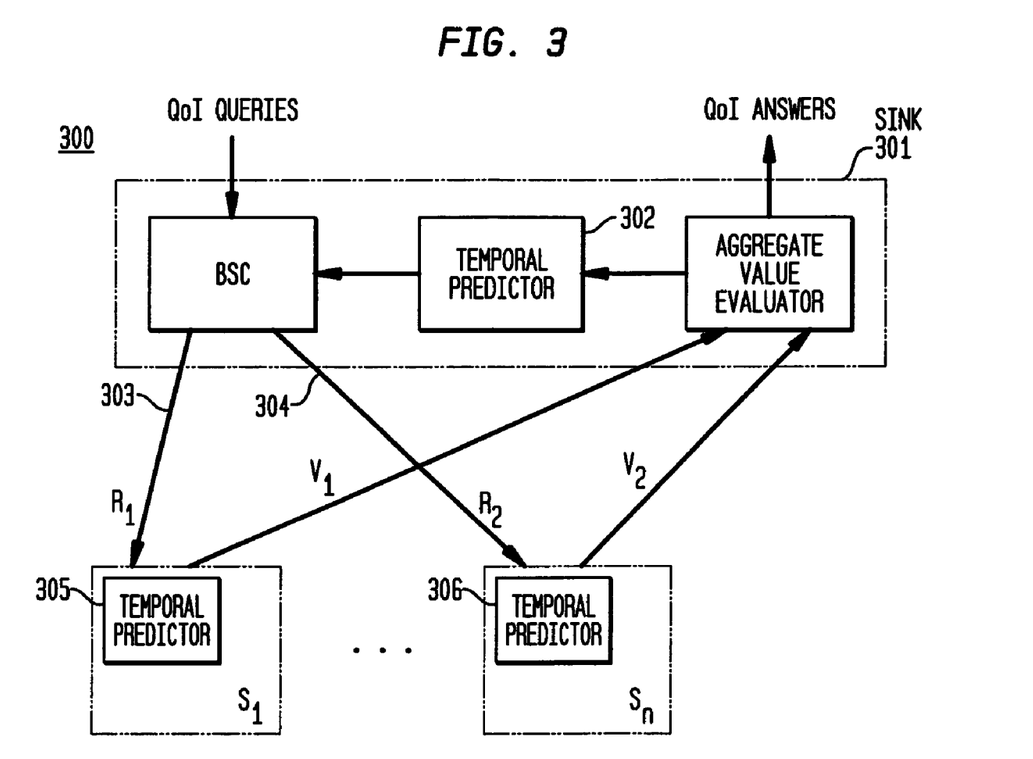
FIG. 3 is a basic diagram illustrating the CAPS architecture according to a second embodiment of the invention implementing temporal prediction.

FIG. 2 depicts a more detailed block diagram of a base CAPS architecture 200 according to the present invention. An enhanced version of the CAPS architecture, is depicted in FIG. 3 that incorporates temporal prediction.

In the first embodiment of the invention as shown in FIG. 2, the computation of the differential bounds for each sensor is performed at the sink, or in general, any other node in the computing infrastructure, based on the stream of data samples received from the sensors. This computation is performed by a logical component called the Bounds Setting Component (BSC). As the data collection process is an event-driven paradigm, different sensors will report back to the sink at different time instants (only when their sampled value falls outside their current range). In general, whenever one of the set of sensors reports back on a new value, the BSC may need to re-compute the precision bounds for each of the individual sensors. This may be needed, even for those sensors with data samples that are still within their currently specified ranges. The computation of the modified ranges for each sensor depends on the specific type of query issued, i.e., on the specific QoI metric that is associated with the application. This computation itself may be performed by a query processing component on the sink, or located on some other computing device with the information infrastructure. Such continual computation of the modified tolerance ranges for each sensor's value ensures that the overall QoI (precision) requirements of the application are never violated.

Thus, as shown in FIG. 2, the sink node 201 comprises the Bounds Setting Component (BSC) 205 component that takes latest data samples from the sensors and computes new bounds, and an Aggregate Value Evaluator (AVE) component 206 that collects the data samples and computes the QoI metric (e.g., a statistic such as mean, average, max, min, sum, etc.) as specified by an application. The CAPS middleware takes the application's QoI requirement ("R") as an external input (QoI queries). Based on these inputs, the BSC 205 computes and informs each individual sensor 202, 203, 204 of its precision range. At time j, sensor i transfers a new value $v_i^j$ to the sink when either $v_i^j > H_i^j$ or $v_i^j < L_i^{j-1}$, where $H_i^j$ denotes the upper bound of the precision range at that instant and $L_i^j$ denotes the lower bound of the precision range at that instant. These current sensor value updates from sensor devices 202, 203 and 204 are depicted as respective update 210, 211 and 212 that are processed in the AVE component 206 as shown in FIG. 2. The AVE simply returns the new aggregation result to the application (QoI answers) if it continues to satisfy application's QoI requirement. Otherwise, the AVE component 206 informs the BSC of the most recent updated sensor values 215. The BSC 205 then calculates and distributes a new set of bounds to the sensors 202, 203, 204, using the underlying sensor routing infrastructure (i.e., sensor network). For instance, as shown in FIG. 2, the BSC computes a new precision range $[L_1, H_1]$ as an update 207 for sensor S1 202; the BSC computes a new precision range $[L_2, H_2]$ as an update 208 for sensor S2 203, and, a new precision range $[L_n, H_n]$ as an update 209 for sensor Sn 204.

It is a primary objective of the invention to reduce the total communication energy consumption in the sensor network, while ensuring conformance to the application's QoI bound. In an exemplary embodiment, a simplified cost function to be minimized is the multihop transmission cost from sensor $s_i$ to the sink and the objective becomes one of minimizing a simplified optimization problem set forth in equation (1) as follows:

$$\text{minimize} \sum_{i \in s} \frac{Hop_i}{(r_i)^2} \quad (1)$$

where $Hop_i$ is the length of the uplink path from sensor si to the sink node over a set of sensors S, and $r_i$ is the interval of sensor i. In this equation, the precision range is specified implicitly via $r_i$ (defined as $H_i$-$L_i$); the actual $H_i$ and $L_i$ values can then be computed by assuming this range to be uniformly spread above and below the sensor $s_i$'s current value.

For the sum and mean aggregation queries, the objective function (1) is minimized when the precision ranges are in the ratio:

$$r_1 : \ldots : r_n = \frac{Hop_1}{(r_1)^2} : \ldots : \frac{Hop_n}{(r_n)^2}. \quad (2)$$

In addition to the above Equation (2), for sum and mean aggregation queries, the $r_i$ values must satisfy the additional constraints as set forth in equations (3) and (4) respectively, as follows:

$$\sum_{i \in S} r_i^j \leq 2R, \forall t_j \quad (3)$$

$$\frac{\sum_{i \in S} r_i^j}{\text{count}(S)} \leq 2R, \forall t_j \quad (4)$$

where R refers to the precision range imposed by the application on the sink for the sum and mean aggregation queries respectively. Given these constraints and the relationship governed by Equation (2), the optimal allocation of $r_i$ among the set of constituent sensors, given an application's QoI, is easily computed.

Moreover, based on the optimum conditional equation (2), an example aggregation function SUM designed as an algorithm performed by the AVE component (FIGS. 2 and 3) is depicted as follows:

---

Algorithm 1
Algorithm of CAPS (aggregation function SUM)

```
 1: procedure CALCULATE_BOUNDS(state, R)
 2:     if state = first_round then        ▷network topology is unknown
 3:         set_static_bounds(R);
 4:         return;
 5:     else if state = second_round then
 6:         set_adaptive_bounds(R);
 7:         return;
 8:     end if
 9:     if network topology has changed then
10:         reset_bounds(sum_of_bounds/R);
11:     end if
12: end procedure
13: procedure set_adaptive_bounds(R)
14:     total_bounds ← max_hops * R;
15:     for i ← 1, max_hops do
16:         ratio_i ← pow(i, 0.33333);   ▷normalized bound ratio of each hop
17:         total_ratio ← total_ratio + ratio_i;
18:     end for
19:     for i ← 1, max_hops do
20:         bound_i ← total_bounds * ratio_i/total_ratio;
21:     end for
22: end procedure
23: procedure reset_bounds(ratio)
24:     for i ← 1, max_hops do
25:         bound_i ← bound_i/ratio;
26:     end for
27: end procedure
```

---

Here, the state variable refers to the condition of whether this adaptive adjustment is being performed for the first, second or subsequent rounds, since the initialization of the algorithm. Initially, for the SUM aggregation algorithm, the bounds are set statically (all the sensors have the same bounds "R"). Once the initial network topology has been learned via the first round sensing value updates, function set_adaptive_bounds assigns different bounds for different hop-counts, which are then broadcast by the sink. Sensors reporting back to the sink algorithm with a data sample also indicate their current bound. CAPS continually normalizes the bounds that it broadcasts at subsequent time instants to adapt to topology changes without knowing the exact network topology. A topology change (such as a new sensor coming on line, or a sensor moving closer or farther from the sink) is implicitly detected whenever the cumulative bounds $$\sum_{i \in set} r_i$$

reported back deviates from the application's QoI requirement (R). If the network topology changes, function reset_bounds re-normalizes the sum_of_bounds, and thus ensures continued adherence to the QoI (without knowing how many sensors are located at various hop counts from the sink). Based on the optimum conditional equation (2), an example aggregation function AVG is similar to the algorithm for computing the SUM except that the result aggregation bound needs to be divided by the number of the sensors.

The aggregation function MIN is designed as an algorithm performed by the AVE component (FIGS. 2 and 3) is depicted as follows:

Algorithm 2
Algorithm of CAPS (aggregation function MIN)

```
 1: procedure CALCULATE_BOUNDS(state, R)
 2:     if state = first_round then       ▷network topology is
    unknown
 3:         set_static_bounds(R);
 4:         return;
 5:     end if
 6:     m_l_b ← calculate_min_lower_bound( );
 7:     if m_l_b has changed then
 8:         reset_bounds(R, m_l_b);
 9:     end if
10: end procedure
11: procedure reset_bounds(R, min_lower_bound)
12:     for i ← 1, max_hops do
13:         if lower_bound_i = min_lower_bound then   ▷
    sensor i has minimum lower bound
14:             bound_i ← R;
15:         else
16:             upper_bound_i ← MAX;
17:             lower_bound_i ← min_lower_bound;
18:         end if
19:     end for
20: end procedure
```

The related algorithm for performing aggregating function MAX (not shown) is symmetric to MIN.

Figure 4:
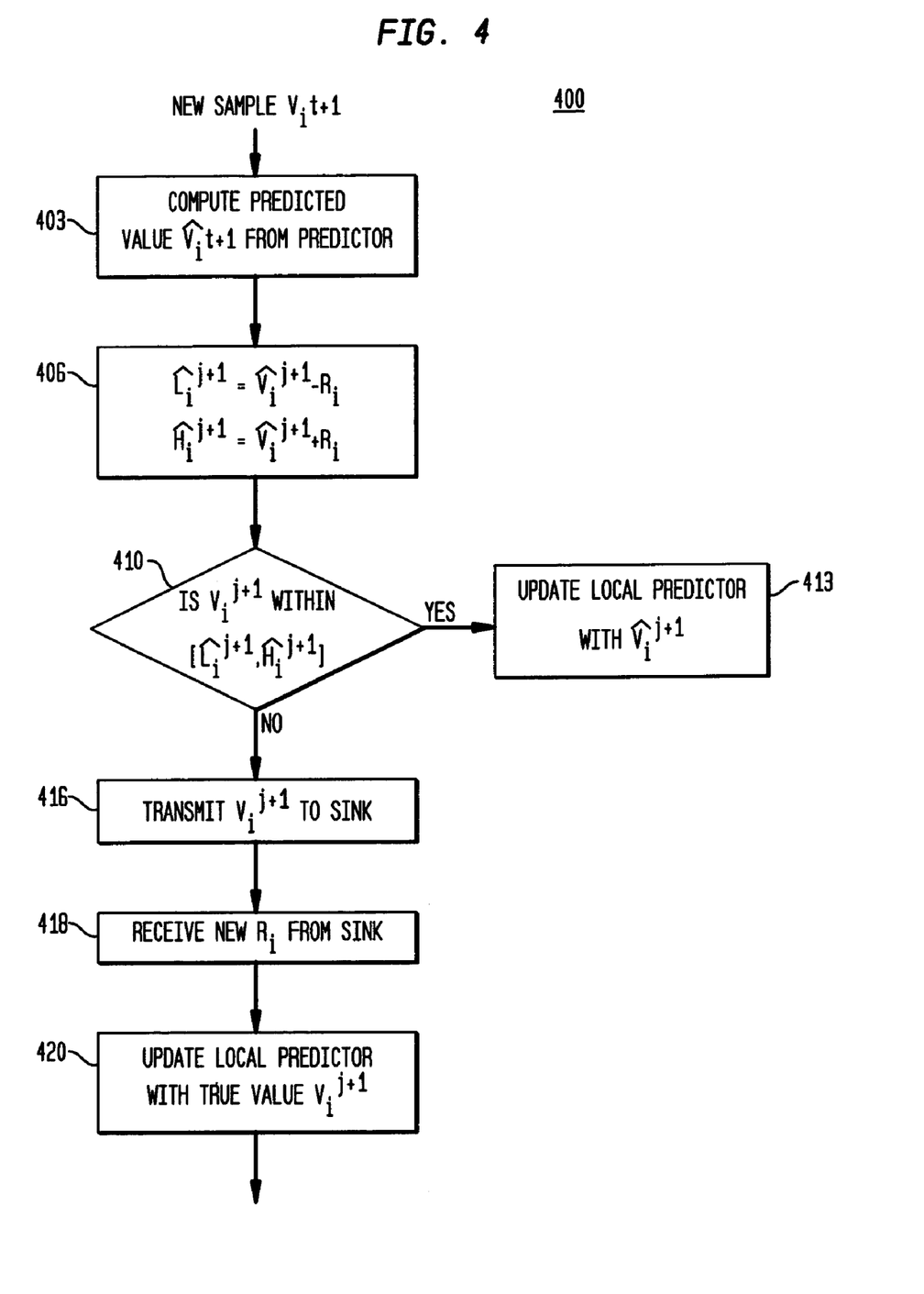
FIG. 4 depicts a process representing the behavior of the sensor implementing temporal prediction.
Figure 5:
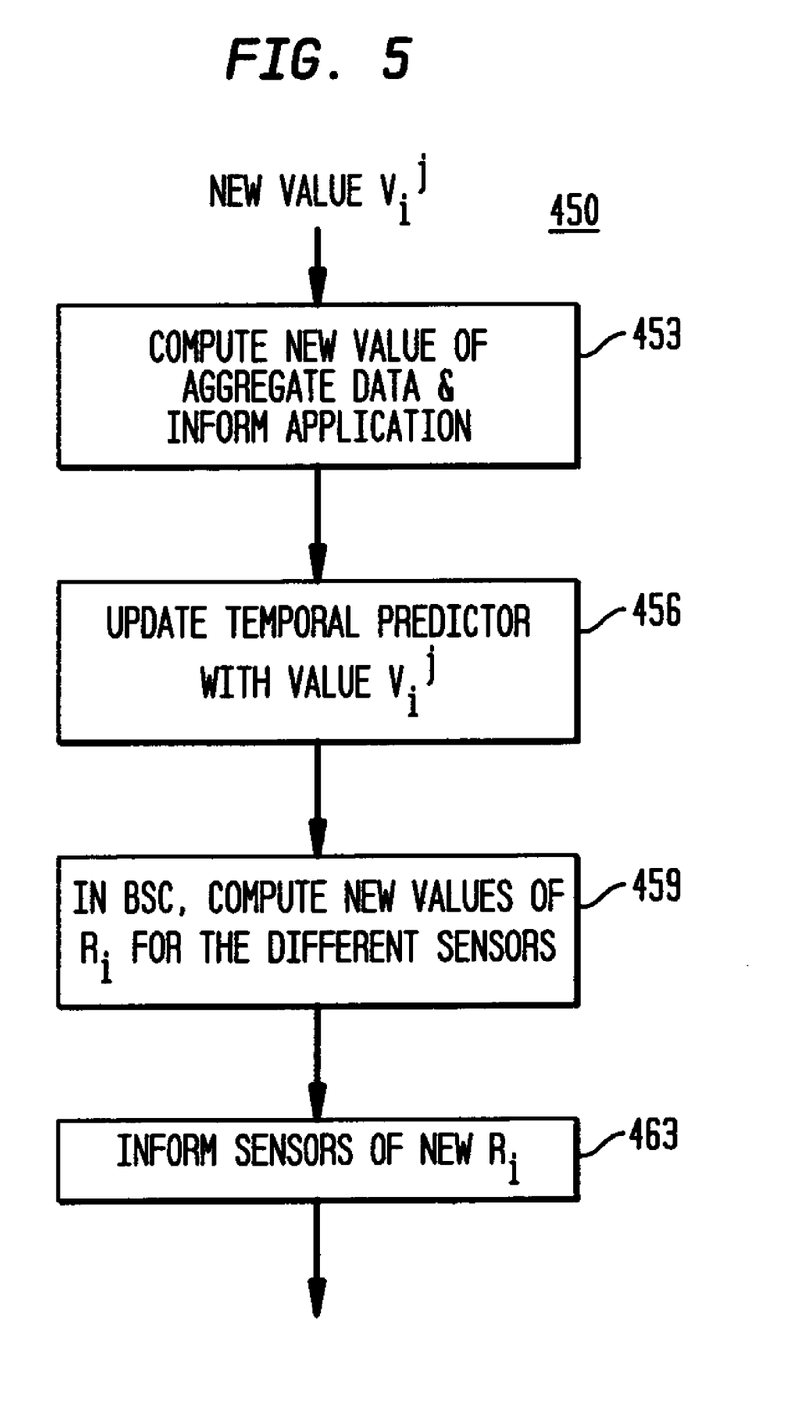
FIG. 5 depicts a process 450 representing the behavior of the sink implementing temporal prediction; and, FIG. 6 depicts a process 475 representing the behavior of the temporal predictor at each time $t_j$.

As mentioned, another aspect of the present invention is to provide a way to specify temporally varying precision ranges to an individual sensor or groups of sensors, without having to explicitly communicate the precision bounds for these different time instants. By using temporally varying precision ranges, the present invention allows for the exploitation of temporal correlation among the sample values recorded by an individual sensor to further reduce the need for reports from the sensors. Such temporal correlation benefits from the reality that, in many environments, there is a known pattern associated with the expected evolution of the data samples reported by a particular sensor. For example, as the day evolves from morning to noon, it may be observed that a particular temperature sensor reports temperature values that increased by 1° C. every 30 minutes, for example. Similarly, as the afternoon is followed by the evening, the temperature reading may diminish by 1° C. every hour. In such a case, if the tolerated range for the sensor's reading is, say, [24° C., 25° C.] at 8:00 A.M., it can be expected that the tolerated range for the sensor's reading should ideally be [25° C., 26° C.] at 9:00 A.M., [26° C., 27° C.] at 10:00 A.M. and so on. In the absence of temporal correlation, the adjustment of the ranges occurs only when a new sample is reported, and is not dynamically updated as time evolves. FIGS. 3-5 describe the system and method to automatically and dynamically update this range in tandem with expected temporal variations, without any actual communication necessary between the sensors and the sink.

FIG. 3 depicts a block diagram of the CAPS architecture 300 according to a second embodiment of the invention. In this second embodiment, automatic updating of the precision range at the sensor utilizes a special Temporal Predictor Component, TPC, which operates in an identical fashion at both the sink and at an individual sensor. This predictor typically runs well-known temporal prediction algorithms (for example, linear filter, ARMA predictor, least-squares predictor, Kalman filter, and the like) that takes the past samples as input and provides a prediction of the most likely value of the next sample (or a sample at some future instant of time) as output. Since the predictors at both the sink and the sensor operate on the same data samples and use an identical prediction algorithm, their predicted values are consistent.

When a predictor is used, the actual instantiation of the predictor at the sink and the sensor can be achieved through a variety of different communication techniques. In one approach, the sensors may come pre-programmed with one (or a set of) specific prediction algorithms. In this case, the sink may merely need to indicate to the sink the particular algorithm to use, and the various parameter values (as required by the specific algorithm). In an alternative approach, the sink may actually transfer the logic of a specific prediction algorithm as executable or compile-able code over the communication network—on receiving this code, the sensor may then instantiate the predictor within its internal operating environment.

More particularly, in the second embodiment of the system architecture 300 depicted in FIG. 3, there is depicted a sink node 301 having BSC and AVE components as in the first embodiment depicts in FIG. 2, and additionally including the TPC 302 that operates on the past data samples to generate new $\{L_i^j, H_i^j\}$ values in tandem with the BSC. These generated values 303, 304 are forwarded to respective sensor devices $S_1$, $S_n$. As further shown in the second embodiment of the invention depicted in FIG. 3, a similar temporal predictor component 305, 306 are provided at each the sensor device $S_1$, Sn. In general, the architecture can accommodate any predictor device (e.g., least-squares, Kalman, etc.). However, it is preferred that the predictor not be overly complicated, to ensure that the additional computational and storage (since past samples must be stored while needed) overhead on the sensor does not prove prohibitive. In one embodiment, the predictor component 305, 306 may comprise a simple linear least-squares (AR) predictor.

Accordingly, in the second embodiment, the TPC at a sensor utilizes a sufficiently long history of the true past samples to continually adjust the predictor coefficients (e.g., using linear least-squares regression), which are then used to predict the next sample value $$\hat{v}_i^{j+1},$$

and then adjust the range $(L_i^j, H_i^j)$ values $$\left(\text{using } L_i^{j+1} = \hat{v}_i^{j+1} - r_i \text{ and } H_i^{j+1} = \hat{v}_i^{j+1} + r_i\right).$$

It is understood that the multi-step linear predictor uses the past predicted values $$\hat{v}_i^j,$$

rather than the true samples $v_i^j$ (except when $v_i^j$ falls outside $(|L_i^j, H_i^j|)$ to ensure consistency with the sink (which usually does not receive the intermediate samples $v_i^j$).

FIG. 4 depicts a process 400 representing the behavior of the sensor implementing temporal prediction. As shown at a first step 403, a new sample value $v_i^{j+1}$ is generated by a sensor and is input to the temporal predictor component of the sensor that computes a predicted value $\hat{v}_i^{j+1}$.

Then, at next step 406, the following predicted lower range value, $$\hat{L}_i^{j+1},$$

and predicted upper range value, $$\hat{H}_i^{j+1},$$

are calculated respectively according to:

$$\hat{L}_i^{j+1} = \hat{v}_i^{j+1} - r_i \text{ and } \hat{H}_i^{j+1} = \hat{v}_i^{j+1} + r_i$$

where the range limit at sensor i is currently denoted by $r_i$.

Continuing at step 410, there is depicted a step of determining whether the actual new sample value $v_i^{j+1}$ is outside the bounds of the predicted ranges $$[\hat{L}_i^{j+1}, \hat{H}_i^{j+1}],$$

or, alternatively, if $$\hat{L}_i^{j+1} < \hat{v}_i^{j+1} < \hat{H}_i^{j+1}.$$

If at step 410, it is determined that the new sample value is within the bounds of the predicted ranges $$[\hat{L}_i^{j+1}, \hat{H}_i^{j+1}],$$

then the local predictor is updated with the $$\hat{v}_i^{j+1}$$

value as indicated at step 413, and no data value is communicated back to the sink. Otherwise, if at step 410, it is determined that the new sample value is outside the bounds of the predicted ranges $$[\hat{L}_i^{j+1}, \hat{H}_i^{j+1}],$$

then the $v_i^{j+1}$ value is transmitted back to the sink as indicated at step 416. Then, at step 418, a new range value $r^j$ is generated at the sink and received by that sensor. Finally, at step 420, the local predictor at the sensor is updated with the actual new value $v_i^{j+1}$.

FIG. 5 depicts a process 450 representing the behavior of the sink implementing temporal prediction. As shown at a first step 453, upon receipt of a new sensor sample value $v_i^j$, the AVE component of the sink computes a new aggregate data value that is transmitted to the querying application. Then, at step 456, the sink's temporal predictor component is updated by receiving the sample value $v_i^j$ as input. Then, at step 459, in the BSC component of the sink, new range limits, $r_i$, for each sensor i, are generated and input to the sensor at next step 463.

Figure 6:
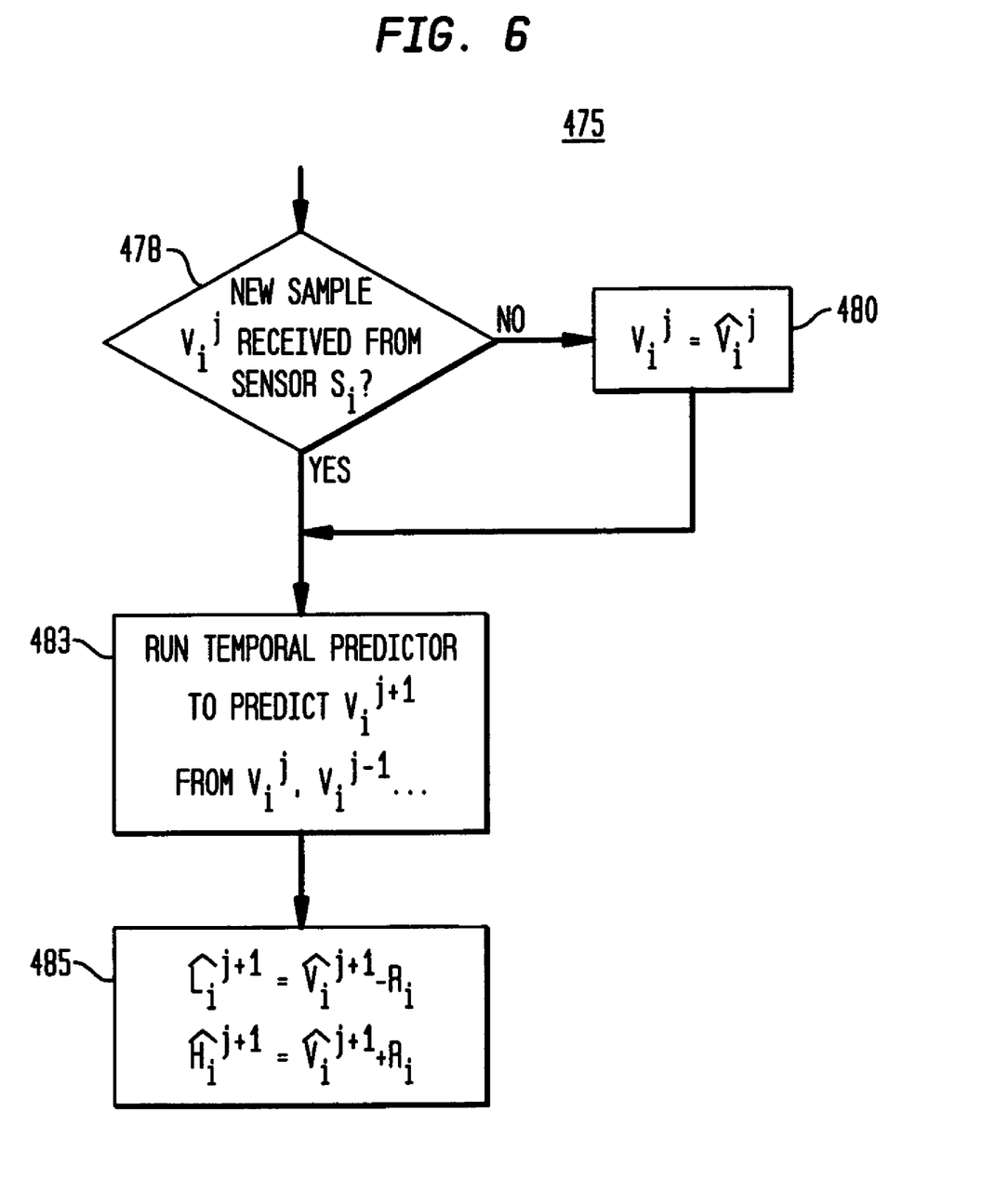

FIG. 6 depicts a process 475 representing the behavior of the temporal predictor at each time $t_j$. A first step 478 depicts the step of determining whether a new sensor sample value $v_i^j$ is received from sensor $S_i$. If at step 478, it is determined that no new value has been received, then, at step 480 the new sample value $v_i^j$ is set equal to the predicted value $$\hat{v}_i^j$$

for sensor $S_i$, i.e., $v_i^j = \hat{v}_i^j$ and the process proceeds to step 483. Otherwise, at step 478, if it is determined that a new value has been received, the process proceeds directly to step 483. At step 483, the temporal predictor component calculates the predicted value $$\hat{v}_i^{j+1}$$

from values $v_i^j$, $v_i^{j-1}$ (these past values are either real values received from the sensor (if the sensor had sent a new value) or the predicted values generated by the temporal predictor at the previous time instants). Finally, at step 485, the predicted lower range value and predicted upper range value are calculated respectively according to:

$$\hat{L}_i^{j+1} = \hat{v}_i^{j+1} - r_i \text{ and } \hat{H}_i^{j+1} = \hat{v}_i^{j+1} + r_i,$$

where the range limit at sensor i is $r_i$.

The basic architecture described herein with respect to FIG. 3, and the flow charts in FIGS. 4-6 highlighting the implementation of temporal prediction including the predictable temporal variation among successive sensor node sample inputs, addresses the problem lying in the inability of the basic bound-adjustment algorithm to factor in the different temporal rates or patterns exhibited by the samples of different sensors. If a sink node could have predicted, e.g., from past behavior, this deterministic evolution, then it can proactively set (without any communication with the sensor) the range on each sensor.

Thus, in the approach depicted in FIGS. 4-6, the sink node specifies a tolerance range (to the sensor) in terms of a deviation or interval around the predicted value at any point in time. For example, the sink may tell a sensor that its precision interval is +1° C. around the predicted value. When combined with the temporal predictor, this implies that the actual or true precision interval is time-varying, i.e., it dynamically changes at the sensor without any communication being needed with the sink. For example, if at time instant t, the predicted value is 37° C., the true interval would be [36° C., 38° C.]. At the instant the next data sample is generated by the sensor, if the predicted value is 39° C., the true interval is [38° C., 40° C.]. In other words, the actual bound within which the sink requires the sensor's value to lie varies with time, even though there is no explicit communication of this between the sink and the sensor.

Other methods may be used to specify the actual temporal variation of the expected value, or the precision range, of each sensor. One alternative method may employ remote prediction components that already know of the expected values of the sensor's samples at different future instants by an offline means. For example, for the case of a sensor reporting on the number of people entering a stadium per minute, an offline predictor may actually predict that the expected number may be 1000 ten minutes before the game, 500 five minutes before the game, 200 at the start of the game and only 10 after the end of the game. This prediction itself may be derived from past observations of behavior of crowds at other stadiums or on some other mathematical models. The automation of the temporal variation of the expected range may then be achieved by communicating these expected values to the sensor at the initial instant—the sensor and the sink may then implicitly be both aware of the expected value (and consequently, the tolerable range) at various time instants without any additional communication.

The present invention has been described with reference to diagrams of methods, apparatus (systems) and computer program products according to embodiments of the invention. It will be understood that each diagram can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method for monitoring values generated by one or more sensor devices in a pervasive sensor environment comprising:

providing a computing node in communication with each said one or more sensor devices, for computing distinct precision ranges for each individual sensor device or subsets of sensor devices, and then communicating said precision ranges to each individual sensor device;

at subsequent time instants, generating new data samples at one or more sensor devices and transmitting data sample values back to the computing node only when said sample values fall outside said computed precision range; and, updating by said computing node, the precision ranges for said one or more sensor devices and communicating updated precision ranges to said one or more sensor devices in response to receipt of a data sample value from that sensor, thereby continually satisfying a quality of information (QoI) bound, as specified by an application requesting a collective metric computed from the individual values of said one or more sensor devices.

2. The method as claimed in claim 1, further comprising: determining by said computing node that a current precision range setting of a sensor is violative of said application's QoI bounds, the computing node computing the best precision ranges based on the QoI metric of interest specified by the application, and the current values of the sensor devices.

3. The method as claimed in claim 1, further comprising: determining by said computing node that the current setting of the precision ranges are not appropriate for the current sensor values, said method further comprising: computing by said computing node, optimal precision ranges based on the QoI metric of interest indicated by said application, and the current values of the sensor devices.

4. The method as claimed in claim 1, further comprising: said computing node computing distinct precision ranges, for subsets of the plurality of sensor devices, in a differential fashion considering a communications overhead or other attributes of each individual sensor devices, or subsets of individual sensor devices.

5. The method as claimed in claim 4, further comprising: receiving by said computing node the individual values of a plurality of sensors, and computing a QoI metric from the individual values of a plurality of sensors.

6. The method as claimed in claim 4, wherein an application executing in said pervasive environment queries said computing node and continually or intermittently receives a collective information statistic guaranteed to lie within a bound on a QoI metric, as computed by said computing node.

7. The method as claimed in claim 4, further comprising: transferring from said computing node, one or more of: executable code, compilable code or computational logic of a prediction algorithm over a sensor network, for installation in a computing infrastructure at said sensor device.

8. The method as claimed in claim 4, further comprising: receiving, at each said sensor devices and the computing node, an expected temporal variation of the data samples, from an external source.

9. The method as claimed in claim 4, further comprising: utilizing a temporal prediction component in said computing node to update, by the computing node, the precision ranges.

10. The method as claimed in claim 9, further comprising: generating, by said sensor device, new data samples at subsequent time instants and transmitting such data samples back to the computing node only when sample values fall out of range of said time-varying precision range previously specified by the computing node, said computing node updating the precision ranges again in response to receipt of the data samples.

11. The method as claimed in claim 9, wherein said temporal prediction component at said computing node continually updates a tolerable range of values for each sensor device, said method further comprising:
checking to ensure that the time-varying tolerable range of values satisfy the QoI requirements of the applications at each new time instant, and
if the QoI requirements of the applications are not satisfied, proactively re-computing the precision ranges for said plurality of said sensors, and transmitting the new ranges to the said plurality of said sensors.

12. The method as claimed in claim 4, further comprising: utilizing a temporal prediction component in a sensor device to implicitly update, by said sensor device, its precision range values to continually update an actual tolerable range of values.

13. The method as claimed in claim 12, further comprising: implementing by said temporal prediction means at the sensor device, a prediction algorithm to obtain the current expected value based on a combination of its own past observed values and past predicted values.

14. The method as claimed in claim 12, wherein said temporal prediction means at the sensor device is provided with a pre-initialized list of candidate prediction algorithms, said method further comprising: informing the computing node, by the sensor device, of the selection of a specific prediction algorithm and the parametric values associated with the specific prediction algorithm.

15. The method as claimed in claim 12, wherein said temporal prediction means at the sensor device is provided with a pre-initialized list of candidate prediction algorithms, said method further comprising: informing an individual sensor device, by the computing node, of the selection of a specific prediction algorithm and the parametric values associated with the specific prediction algorithm.

16. An apparatus for monitoring values generated by one or more sensor devices in a pervasive environment comprising:
a computing node in communication with each said one or more sensor devices for computing distinct precision ranges for each individual sensor device or subsets of sensor devices, and communicating said precision ranges to each individual sensor device;
each such said sensor device generating new data samples at subsequent time instants and transmitting data sample values back to the computing node only when said sample values fall outside said computing precision range;
wherein said computing node communicates updated precision ranges to an individual sensor device in response to receipt of a data sample value from that sensor device, thereby continually satisfying a quality of information (QoI) bound as specified by an application requesting a collective metric computed from the individual values of said one or more sensor devices.

17. The apparatus as claimed in claim 16, wherein said computing node determines that a current precision range setting of a sensor is violative of said application's QoI bounds, the computing node computing the best precision ranges based on the QoI metric of interest specified by the application, and the current values of the different sensor devices.

18. The apparatus as claimed in claim 16, wherein said computing node further determines that the current setting of the precision ranges are not appropriate for the current sensor values, and computes a best precision ranges based on the QoI metric of interest indicated by said application, and the current values of the different sensors.

19. The apparatus as claimed in claim 16, further comprising: computing by said computing node distinct precision ranges in a differential fashion considering the communications overhead or other attributes of each individual sensor devices, or subsets of individual sensor devices.

20. The apparatus as claimed in claim 19, wherein said computing node further receives the individual values of a plurality of sensors, and computes a QoI metric from the individual values of a plurality of sensors.

21. The apparatus as claimed in claim 19, wherein an application executing in said pervasive environment queries said computing node and continually or intermittently receives a collective information statistic guaranteed to lie within a bound on a QoI metric.

22. The apparatus as claimed in claim 19, wherein said computing node further transfers one or more of: executable code, compilable code or computational logic of a prediction algorithm over a sensor network for installation in a computing infrastructure at said sensor device.

23. The apparatus as claimed in claim 19, wherein each said sensor device and the computing node receives an expected temporal variation of the data samples, from an external source.

24. The apparatus as claimed in claim 19, further comprising: a temporal prediction component in said computing node to update, by the computing node, the precision ranges.

25. The apparatus as claimed in claim 24, wherein said sensor device generates new data samples at subsequent time instants and transmits such data samples back to the computing node only when sample values fall out of range of said time-varying precision range previously specified by the computing node, said computing node updating the precision ranges again, in response to receipt of the data samples.

26. The apparatus as claimed in claim 24, wherein said temporal prediction component at said computing node continually updates a tolerable range of values for each sensor device, said computing node further checking to ensure that the time-varying tolerable range of values satisfy the QoI requirements of the applications at each new time instant, and if the QoI requirements of the applications are not satisfied, proactively re-computing the precision ranges for said plurality of said sensors, and transmitting the new ranges to the said plurality of said sensors.

27. The apparatus as claimed in claim 19, further comprising: a temporal prediction component in a sensor device for implicitly updating, by said sensor device, its precision range values to continually update an actual tolerable range of values.

28. The apparatus as claimed in claim 27, wherein said temporal prediction means at the sensor device implements a prediction algorithm to obtain the current expected value based on a combination of its own past observed values and past predicted values.

29. The apparatus as claimed in claim 27, wherein said temporal prediction means at the sensor device is provided with a pre-initialized list of candidate prediction algorithms, said apparatus further comprising: means for informing the computing node, by the sensor device, of the selection of a specific prediction algorithm and the parametric values associated with the specific prediction algorithm.

30. The apparatus as claimed in claim 27, wherein said temporal prediction means at the sensor device is provided with a pre-initialized list of candidate prediction algorithms, said apparatus further comprising: means for informing the sensor, by the computing device, of the selection of a specific prediction algorithm and the parametric values associated with the specific prediction algorithm.

31. A program storage device readable by a machine, tangibly embodying a program of instructions executable by the machine to perform method steps for monitoring one or more sensor devices in a pervasive sensor environment, the method steps comprising:

providing a computing node in communication with each said one or more sensor devices, for computing distinct precision ranges for each individual sensor device or subsets of sensor devices, and then communicating said precision ranges to each individual sensor device;

at subsequent time instants, generating new data samples at one or more sensor devices and transmitting data sample values back to the computing node only when said sample values fall outside said computed precision range: and, updating by said computing node, the precision ranges for said one or more sensor devices and communicating updated precision ranges to said one or more sensor devices in response to receipt of a data sample value from that sensor, thereby continually satisfying a quality of information (QoI) bound, as specified by an application requesting a collective metric computed from the individual values of said one or more sensor devices.

* * * * *